US012154260B2

(12) United States Patent
Schleith et al.

(10) Patent No.: US 12,154,260 B2
(45) Date of Patent: Nov. 26, 2024

(54) SURFACE INSPECTION SYSTEM

(71) Applicant: Carl Zeiss Industrielle Messtechnik GmbH, Oberkochen (DE)

(72) Inventors: Christian Schleith, Neubeuern (DE); Stefan Dieball, Nußdorf am Inn (DE); Béla Pontai, Munich (DE)

(73) Assignee: Carl Zeiss Industrielle Messtechnik GmbH, Oberkochen (DE)

(*) Notice: Subject to any disclaimer, the term of this patent is extended or adjusted under 35 U.S.C. 154(b) by 0 days.

(21) Appl. No.: 18/215,739

(22) Filed: Jun. 28, 2023

(65) Prior Publication Data

US 2023/0419471 A1 Dec. 28, 2023

(30) Foreign Application Priority Data

Jun. 28, 2022 (DE) ...................... 10 2022 116 099.8

(51) Int. Cl.
*G06T 7/00* (2017.01)
*H04N 23/56* (2023.01)
(Continued)

(52) U.S. Cl.
CPC ........... *G06T 7/0004* (2013.01); *H04N 23/56* (2023.01); *H04N 23/695* (2023.01); *H04N 23/90* (2023.01);
(Continued)

(58) Field of Classification Search
CPC ......... G06T 7/0004; G06T 2207/10024; G06T 2207/30108; H04N 23/695; H04N 23/56; H04N 23/90
See application file for complete search history.

(56) References Cited

U.S. PATENT DOCUMENTS

| | | | |
|---|---|---|---|
| 5,150,395 A | | 9/1992 | Kosanetzky et al. |
| 5,963,328 A | * | 10/1999 | Yoshida ............. G01N 21/8806 356/600 |
| 10,753,882 B1 | * | 8/2020 | Mahajan ................. H04N 7/18 |
| 10,760,901 B2 | | 9/2020 | Wagner |

(Continued)

FOREIGN PATENT DOCUMENTS

| | | |
|---|---|---|
| CN | 103048868 A | 4/2013 |
| CN | 104298065 A | 1/2015 |

(Continued)

OTHER PUBLICATIONS

Office Action issued in German Patent Application No. DE 10 2022 116 099.8, dated Feb. 17, 2023 (from which this application claims priority) and English language translation thereof.
(Continued)

*Primary Examiner* — James T Boylan
(74) *Attorney, Agent, or Firm* — Ewers IP Law PLLC; Falk Ewers

(57) ABSTRACT

A surface inspection system for capturing surface defects of a surface to be checked, includes a camera system, an illumination system including one or more light sources, and an evaluation system. The evaluation system evaluates a brightness and/or color distribution of the surface to be checked in at least one image captured by the camera system and captures surface defects of the surface to be checked as local deviations in the brightness and/or color. The evaluation system is configured to assess a local deviation in the brightness and/or color as a surface defect when the local deviation appears brighter in at least one first subregion and darker in at least one second subregion than a surface region surrounding the local deviation, and/or different colors are dominant in different subregions.

14 Claims, 13 Drawing Sheets

(51) Int. Cl.
  *H04N 23/695*  (2023.01)
  *H04N 23/90*  (2023.01)
(52) U.S. Cl.
  CPC .............. *G06T 2207/10024* (2013.01); *G06T 2207/30108* (2013.01)

(56) References Cited

U.S. PATENT DOCUMENTS

| | | | |
|---|---|---|---|
| 2004/0246473 A1* | 12/2004 | Hermary | G01N 33/46 356/237.1 |
| 2005/0254378 A1 | 11/2005 | Wagner et al. | |
| 2007/0047801 A1* | 3/2007 | Kojima | G09G 3/006 382/149 |
| 2012/0327295 A1 | 12/2012 | Beck | |
| 2017/0122878 A1* | 5/2017 | Ono | G01B 11/245 |
| 2017/0191946 A1* | 7/2017 | Smith | G07D 7/12 |
| 2019/0391382 A1* | 12/2019 | Chung | G02B 21/367 |
| 2022/0011239 A1* | 1/2022 | Tai | G01N 21/8806 |
| 2022/0063200 A1* | 3/2022 | Kothari | B29C 64/194 |
| 2022/0155179 A1* | 5/2022 | Jeketo | G01B 7/285 |
| 2023/0005129 A1 | 1/2023 | Nolte et al. | |
| 2023/0011307 A1* | 1/2023 | Schröck | G06V 10/764 |
| 2023/0140278 A1 | 5/2023 | Leute et al. | |

FOREIGN PATENT DOCUMENTS

| | | | |
|---|---|---|---|
| DE | 3021448 | * 12/1981 | ............ G01B 11/25 |
| DE | 3021448 A1 | 12/1981 | |
| DE | 102007058217 A1 | 6/2009 | |
| DE | 102009058215 A1 | 6/2011 | |
| DE | 102010001715 A1 | 8/2011 | |
| DE | 102015212910 A1 | 1/2017 | |
| DE | 102019133364 B3 | 3/2021 | |
| DE | 102020109945 A1 | 10/2021 | |
| WO | 9812543 A1 | 3/1998 | |
| WO | 2004051186 A1 | 6/2004 | |
| WO | 2009068654 A2 | 6/2009 | |

OTHER PUBLICATIONS

Decision to grant issued in German Patent Application No. DE 10 2022 116 099.8, dated Sep. 22, 2023 (from which this application claims priority) and English language translation thereof.

Office Action dated Jul. 6, 2024 issued in Chinese counterpart application No. 202310774061.2 and English-Language Translation thereof.

* cited by examiner

FIG. 13         Prior art
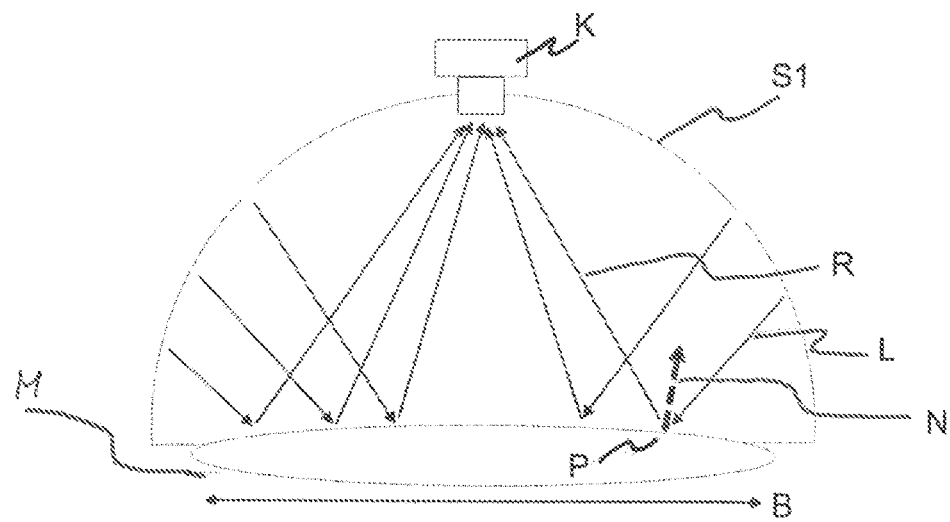
FIG. 14         Prior art
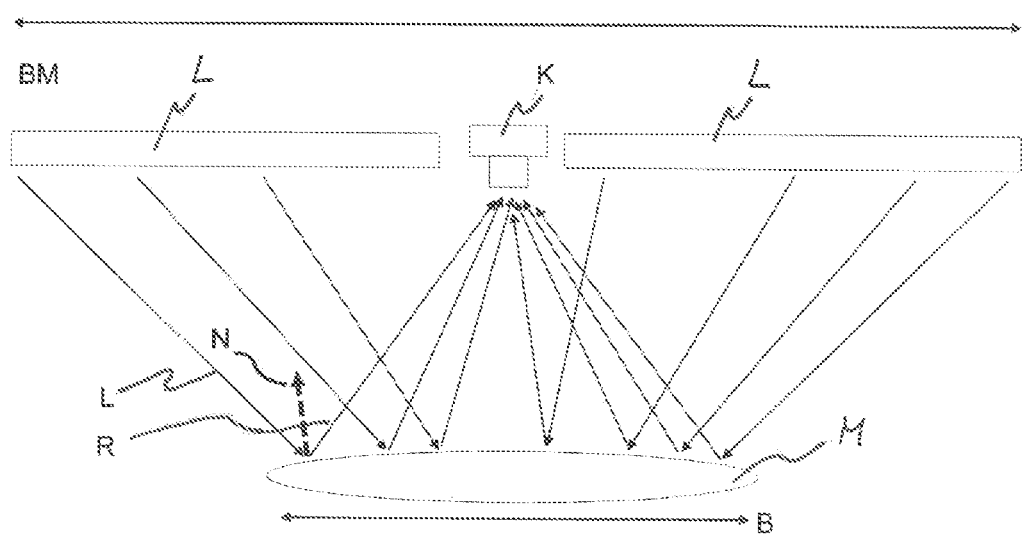

SURFACE INSPECTION SYSTEM

CROSS REFERENCE TO RELATED APPLICATIONS

This application claims priority to German patent application DE 10 2022 116 099.8, filed Jun. 28, 2022, the entire content of which is incorporated herein by reference.

TECHNICAL FIELD

The present disclosure relates to a surface inspection system for capturing surface defects of a surface to be checked, including a camera system and an illumination system, wherein the illumination system generates, together with the reflection and scattering properties of the surface to be checked, a brightness distribution in which surface defects become visible as local deviations in the brightness, said distribution being detected by the camera system.

BACKGROUND

Industrial quality control is often faced with the task of examining the surface of a product or intermediate product for surface defects. Surface defects within the meaning of the present disclosure are deviations from the desired shape of the surface of the measurement object. Such surface defects include, e.g., local small-scale deviations from the desired surface shape, e.g., scratches, compression marks or dents in pressed sheet-metal products or contaminations on the surface, e.g., adhesive residues or weld beads. In particular, they may be local small-scale shape deviations in a region of a component which otherwise is substantially flat or free of contour elements.

It is an objective of the surface inspection to detect such defects. The result may be qualitative—e.g., presence of a defect, classification of the extent or the degree of the deviation from the desired surface—or alternatively may contain quantitative information, e.g., the depth of a compression mark. For the detection, the surface defect must stand out from the rest of the surface in some form, that is to say that there has to be a contrast.

For optical surface inspection, generally the following properties of surface defects may be utilized in order to produce a detectable contrast: Local severe deviations of the surface normal (the surface normal for an arbitrary point P of the surface is given by a unit vector that is perpendicular to the tangential plane at the point P) or change in the reflection properties and scattering properties of the surface. The contrast may then be detectable, e.g., as a brightness difference during the surface inspection.

In accordance with one aspect of the present disclosure, however, surface defects, i.e., local deviations from a desired shape of the surface, are intended to be differentiated from local deviations in the reflection properties and scattering properties of the surface, which are, e.g., produced as a result of local changes in the microscopic surface structure. Only the former are intended to be understood as surface defects within the meaning of the present disclosure. This poses particular challenges for the surface inspection system.

Reference is made hereinafter to the surface to be tested. That is, the surface of one or more bodies or a subregion of these surfaces which are intended to be captured by the surface inspection system. The check field is the spatial region in the optical field of view of the surface inspection system in which the latter can capture the surface to be checked and detect surface defects. Depending on the size of the surface to be checked, the check field can completely or partly capture the surface to be checked. In the latter case, a displacement of the surface inspection system and further recordings are then necessary in order to capture the entire surface.

Optical surface inspection systems detect defects without contact with the aid of light, i.e., electromagnetic radiation. An illumination system and a detection system are used here in most cases. The illumination system contains one or more light sources for emitting light, and the detection system contains one or more light detectors. If the detection system consists of one or more cameras, it is referred to as a camera system.

The light according to an aspect of the disclosure may include one or more wavelengths or may include one or more wavelength ranges. Different wavelengths or wavelength ranges are referred to as colors. The wavelength range in which optical surface inspection systems operate is generally determined by the range in which the light detectors used are sensitive. What are often used as light detectors are photodiodes or arrays of photodiodes. The latter are used for example in monochromatic cameras or color cameras. The individual photodetectors are referred to as pixels. Color cameras usually have three different types of pixels that are sensitive in different wavelength ranges; in general, those are the blue, green, and red spectrum ranges of the visible spectrum. These sensitivity ranges are referred to as color channels of the camera.

By way of example, light emitting diodes (LEDs), organic light emitting diodes (OLEDs), lasers or gas discharge lamps are used as light sources for the illumination system. The light sources or the illumination system may be differentiated as being point type, linear, rod-shaped, ring-shaped, on the basis of the spatial extent and arrangement of the light-emitting regions. Point light sources are, e.g., lasers or LEDs having a very small emission surface. Rod-shaped light sources are, e.g., gas discharge tubes. Linear, ring-shaped, rod-shaped light sources may, e.g., also be realized with a corresponding arrangement of LEDs. Moreover, light sources or illumination systems may be differentiated by way of the emission characteristic. By way of example, lasers usually emit directionally into a narrow angular range, and gas discharge lamps or LEDs nondirectionally into a large angular range. The emission characteristic of the light source may be influenced in the illumination system by reflectors, lenses, Fresnel lenses, diffusing plates, waveguides.

Primarily the scattering and reflection properties of the surface are of importance for the optical surface inspection. A distinction is drawn between different types of surfaces depending on scattering and reflection properties:

Optically smooth surfaces are surfaces with surface roughness smaller than the observation wavelength. Examples are polished metal or glass surfaces, and varnished surfaces. Light that impinges on the surface at a certain angle with respect to the surface normal is completely or partly reflected according to the law of reflection. According to the law of reflection, the light is reflected only in one discrete direction. In this case, angle of incidence and angle of reflection relative to the surface normal are equal in terms of their absolute value, and incidence direction, reflection direction and surface normal lie in one plane.

Optically rough surfaces have surface roughnesses larger than the observation wavelength. They exhibit diffuse scattering behavior (e.g., chalk, etc.). The ideal case is the Lambertian scatterer. Here the scattered intensity is not dependent on the observation direction but rather only on the cosine of the angle between incidence direction and surface normal.

Optically lustrous surfaces: Encountered in the area of transition from optically rough surfaces with diffuse scattering behavior and optically smooth, specularly reflective surfaces. The surface roughnesses are in the range of the wavelength of the observation light. The light is typically reflected or scattered in the "reflection direction". However, unlike in the case of reflection at optically smooth surfaces, the scattering lobe has a finite width. However, the scattering is nevertheless highly directional, and the scattered intensity decreases relatively rapidly toward larger and smaller angles. So-called directional reflections arise. Lustrous surfaces arise as a result of numerous material processing and shaping methods, such as pressing, grinding, machining shaping.

Deflectometry, photometric stereo, and color deflectometry are methods that are used in the optical detection of surface defects: Primarily normal-measuring methods are advantageous for the surface inspection. These methods directly determine the orientation of the surface normal or deviations with respect to the surroundings qualitatively or quantitatively. Local shape deviations in the surface become visible directly here—without the influence of measurement errors and error propagation such as occur, e.g., during the determination of the surface normal from the surface data with mathematical gradient formation. Measuring methods mentioned above are explained below:

In deflectometry, the mirror image of a structured light source on the surface to be checked is observed with a camera. If the surface normal of the surface to be checked deviates locally, a distortion of the image representation of the structured light source occurs. This method functions only for optically smooth surfaces where the light is reflected in accordance with the law of reflection. If scattering additionally occurs at the surface, light emitted from a point of the structured light source may impinge on different camera pixels by way of different points of the surface—the image representation of the structured light source becomes blurred. A unique assignment of the points of the structured light source and the camera pixels is no longer possible, and only inaccurate or no detection of surface defects is thus possible.

In color deflectometry, the different points of the areal or linear light source are not, or not exclusively, encoded by way of brightness differences, but rather also by way of different colors or color profiles. In DE 10 2010 001 715 A1 ("Method and device for surface inspection", Bosch), a rotationally symmetrical component having a smooth surface is illuminated by way of a linear light source with a defined color profile. A color linear array camera captures the chromatically encoded image data. From the color profile on the camera linear array, it is possible to reconstruct the orientation of the surface normal in a narrow strip on the object surface. Capturing the entire surface necessitates progressive recordings of the rotating object. With color modulation in two directions or a combination of brightness and color modulation, this method also makes it possible to capture and inspect relatively large regions of the surface to be checked with one recording.

The photometric stereo method is used for the inspection of optically rough surfaces. Here each point of the object surface is illuminated from at least three different linearly independent directions and the surface is observed using a camera. The scattering properties of the surface to be measured must be such that the scattered intensity is dependent only on the angle of incidence of the light relative to the surface normal—but not on the observation direction. That is ideally satisfied for a Lambertian scatterer. From the ratio of the scattering intensities for the at least three illumination directions, it is then possible to determine the direction of the surface normal at each point of the surface to be checked. The method can also be used for the inspection of textured surfaces where the reflectivity or the scattering amplitude varies for different points of the surface. A disadvantage is that a plurality of recordings is always required for an inspection of the surface. The method is thus applicable only under static conditions when no relative movement of surface inspection system and surface to be checked occurs. A further, crucial disadvantage of this method is the limitation to optically rough surfaces with defined scattering behavior. Optically lustrous surfaces, in particular, such as occur in numerous industrial manufacturing methods and frequently used materials, cannot be inspected.

Few methods have been disclosed heretofore for the inspection of lustrous surfaces. WO 2004/051186 A1 ("METHOD AND DEVICE FOR OPTICAL FORM MEASUREMENT AND/OR ESTIMATION", SAC) describes a method by which surfaces can be inspected relatively independently of their scattering properties. The method functions for optically smooth, rough and lustrous surfaces. A combination of deflectometry and photometric stereo is used for this purpose. The device is shown schematically in FIG. 13. A typically hemispherical scattering body (S1) illuminated by a plurality of light sources illuminates the surface to be checked in the region of the check field (M) in such a way that at each point (P) of the surface, for each possible orientation of the surface normal (N), a beam (L) exists which is scattered or reflected (R) directionally into the camera (K). The respective orientation of the surface normal can be determined by an areal encoding with a specific brightness distribution of the locations on the scattering body. Reconstructing the shape of the object requires three camera recordings, alternatively three color channels red, green, blue, a color camera and a single-color object.

Besides the illumination of the object by way of a spherical scattering body, planar illumination devices are also possible, as described in DE 10 2015 212 910 ("Device for illuminating objects", SAC). A corresponding device is illustrated in FIG. 14. Here, at least two illumination distributions are produced on a planar emission surface (L) in order to areally encode the locations on the emission surface. In all these embodiments, however, the condition that a directional reflection (R) into the camera is produced by way of each point of the surface to be checked must always be met. In order to ensure that, for each possible orientation of the surface normal, a beam exists which is reflected into the camera, each point of the object must be illuminated from a corresponding number of different directions. This inevitably results in the condition that the area enclosed by the illumination device must always be significantly larger than the area of the surface to be measured, and thus the areal extent (BM) of the illumination device must always be significantly larger than the dimensions (B) of the check field. That results in significant disadvantages in practice. Hereinafter, the term extent of the surface inspection system, of the illumination system or of the surface to be checked is always used as areal extent.

Inspecting the surface of an object using the devices and methods described in the prior art necessitates illumination devices whose extent significantly exceeds the dimensions of the object to be checked. That has far-reaching disadvantages in applications in practice, including in particular:

Using a surface inspection system having a given extent, the inspection of a large object to be checked, e.g., a pressed part from the automotive industry, is possible only with the progressive measurement of many relatively small subregions.

Owing to the large dimensions of the surface inspection system, a relatively large free volume must be available for this in front of the object to be checked, in order to avoid collisions. In particular, the shape of the object, the object mount, the surroundings of the object must be compatible with the dimensions of the surface inspection system.

The surface inspection system has a significantly larger weight owing to the large dimensions of the illumination system. That makes it more difficult to handle.

Particularly in automated robotic applications, a great weight and a mass distribution far away from the recording point restrict the handleability and measuring speed owing to high forces and moments.

In some methods, a predefined, often very small distance with respect to the object to be checked is additionally necessary in order to satisfy the angular condition for the illumination. In some of the methods described above, for the detection of surface defects it is necessary to record a plurality of images in temporal succession for different brightness distributions produced progressively by the illumination system. No or only little relative movement of the object to be checked and the surface inspection system is permissible during the recording. Particularly in automated applications, the sensor has to be stopped before the measurement of each subregion of the object to be checked. This significantly increases the time needed for the inspection of relatively large objects that cannot be captured by one measurement. Inline inspection systems integrated in manufacturing may then no longer be able to keep up with the manufacturing cycle. That is a serious disadvantage precisely for automated, robot-aided inspection applications such as are often used in inline inspection during the manufacturing of large objects, e.g., in production lines in the automotive industry.

Furthermore, in the methods in accordance with the prior art the evaluation of the recordings is often very complex and produces a large amount of information that is not necessary or suitable for capturing surface defects. Furthermore, it is often difficult to differentiate surface defects from local changes in the scattering and reflection properties.

SUMMARY

It is an object of the disclosure to provide an improved device for optically inspecting surfaces which overcomes at least some of the problems mentioned above. In particular, a simple device for optically inspecting surfaces is required whose extent does not, or not crucially, exceed the extent of the surface to be checked and thus affords significant advantages over the prior art in applications in practice, and/or which operates substantially independently of the scattering and reflection properties of the surface or is suitable for lustrous surfaces, and/or which allows simple but reliable capture of surface defects.

The object is achieved in according to a first aspect with surface inspection systems, as described herein.

The present disclosure encompasses, according to a first aspect, a surface inspection system for capturing surface defects of a surface to be checked, including a camera system, an illumination system and an evaluation system, wherein the evaluation system evaluates a brightness and/or color distribution of the surface to be checked in at least one image captured by the camera system and captures surface defects of the surface to be checked as local deviations in the brightness and/or color. In this case, provision is made for the evaluation system to assess a local deviation in the brightness and/or color as a surface defect if the local deviation appears brighter in at least one first subregion and darker in at least one second subregion than a surface region surrounding the local deviation, and/or if different colors are dominant in different subregions.

The first aspect of the present disclosure is based on the observation that the two opposite flanks of a surface defect reflect in one instance more and in one instance less light of a light source than the surroundings, at any rate under favorable angular conditions between light source and camera, depending on the orientation of the flank. Alternatively or additionally, with the use of spatially separate light sources or spatially separate regions of light sources of different colors, depending on the orientation of the flank, one color or the other will be dominant, i.e., stand out more intensely than the other color. As a result, a surface defect can be differentiated from a local change in the scattering or reflection properties, which usually leads to a brighter or darker appearance overall and/or affects all colors equally.

In particular, the evaluation system therefore determines regions with a local deviation in the brightness and/or color, i.e., regions which locally deviate in their brightness and/or color in relation to surroundings with uniform brightness and/or color. In this case, with the use of a color camera, a deviation in the brightness can be determined either separately for a plurality of color channels or jointly over all the color channels.

However, in a first variant, a region with a local deviation in the brightness and/or color is assessed as a surface defect only if the local deviation appears brighter in at least one first subregion and darker in at least one second subregion than the surface region surrounding the local deviation. In this case, with the use of a color camera, such a deviation in the brightness can be determined either separately for a plurality of color channels or jointly over all the color channels.

In a second variant, with the use of a color camera, a region with a local deviation in the brightness and/or color can be assessed as a surface defect even if different colors are dominant in different subregions, i.e., when a first color channel appears brighter than the rest of the color channels in at least one first subregion and a second color channel appears brighter than the rest of the color channels in at least one second subregion.

In a second aspect, the present disclosure encompasses a surface inspection system for capturing surface defects of a surface to be checked, including a camera system, an illumination system including one or more light sources, and an evaluation system, wherein the evaluation system evaluates a brightness and/or color distribution of the surface to be checked in at least one image captured by the camera system and captures surface defects of the surface to be checked as local deviations in the brightness and/or color. The second aspect is characterized by the fact that the camera system includes at least two cameras which completely or partly image the surface to be checked, wherein the cameras and one or more light sources of the illumination system are arranged with respect to one another in such a way that the directional reflections of the light source or light sources for each camera appear at different locations of the check field of the surface inspection system.

The disclosure, both in accordance with the first aspect and in accordance with the second aspect, makes it possible to capture surface defects on optically rough and lustrous surfaces such as occur in numerous processing methods and materials used in industrial manufacturing.

The inventors of the present disclosure have recognized that the angular conditions between light source and camera are of importance for the reliable detection of surface defects. In particular, in this case, it is possible to capture surface defects in the vicinity of a first region with directional reflections particularly reliably since deviations in the surface normal produce particularly large changes in the brightness, such that one flank of the surface defect appears brighter, and the other flank darker, than the surroundings.

The use of a plurality of cameras in accordance with the second aspect means that the region in which there are favorable conditions for capturing surface defects is correspondingly enlarged. Conversely, the use of at least two cameras means that the size of the device and in particular of the illumination system can be reduced in comparison with the extent of the check field.

In one possible configuration of the present disclosure, for each camera, alongside a first region of the check field in which directional reflections of a light source appear, a second region of the check field without directional reflections of the light source remains.

In this case, the inventors of the present disclosure have recognized that surface defects in a second region which is arranged alongside a region with directional reflections and in which nondirectional scattering is therefore present can be captured particularly reliably. This is because in a first region with directional reflection a surface defect only appears as a darker region and can therefore scarcely be distinguished from a local change in the reflection properties. Furthermore, it is easily outshone by its very bright surroundings. The conditions are by contrast more favorable in a second region without directional reflections, which however is situated in the vicinity of a region with directional reflections.

The conditions are by contrast less favorable again in a third region without directional reflections, which is arranged further away from a region with directional reflection, since here as well a surface defect usually only appears as a darker region and can therefore scarcely be distinguished from a local change in the reflection properties.

The second regions within the meaning of the present disclosure typically extend on both sides of a first region with directional reflection up to a maximum distance of 10 cm and/or 20% of the working distance between surface inspection system and surface to be checked, more typically 6 cm and/or 15% of the working distance between surface inspection system and surface to be checked. By contrast, regions that are further away typically constitute third regions within the meaning of the present disclosure.

Typically, the second region for each color channel and per camera covers at least 10% of the area of the check field, typically at least 15%.

With the use of a plurality of cameras, the second region for each color channel, for all the cameras taken together, covers typically at least 40% of the area of the check field, more typically at least 60%.

Typically, the second regions over all the color channels and cameras taken together cover the entire check field.

Utilizing the regions without directional reflections makes it possible in turn to reduce the size of the device and in particular of the illumination system since the functioning of the surface inspection system no longer depends on a directional reflection of the illumination system being present for each region of the check field.

Typically, the camera system includes at least 4 cameras, more typically at least 6 cameras. This enables a large check field to be covered.

Typically, the cameras are arranged in columns and rows. This allows a particularly large check field to be covered.

In one possible configuration of the present disclosure, at least two cameras arranged in the same row or column are arranged offset relative to one another in a direction running perpendicularly to the extent of the row or column. This expands the region in which there are favorable measurement conditions at least in respect of one camera.

Insofar as the position of directional reflections of the light source or light sources of the illumination system in the check field is mentioned here in the context of the present disclosure, the present disclosure assumes that the check field is a plane which extends in a measurement region capturable by the surface inspection system in a plane arranged centrally in relation to the measurement depth and typically extends parallel to a plane defined by the position of the cameras. In one exemplary embodiment of the present disclosure, however, the specified conditions apply to all measurement depths, i.e., in each measurement plane which runs within the measurement region, and which extends parallel to the check field defined in this way.

The first and second aspects are each independent of one another and can each be used by themselves. In this regard, for example, an evaluation in accordance with the first aspect can also be used in the case of a surface inspection system with only one camera. For this system, favorable conditions for capturing surface defects are present only in a smaller subregion of the check field. However, by way of example, the surface to be measured can be checked in a plurality of steps with an offset position of the surface inspection system in each case. Furthermore, a surface inspection system is also conceivable in which a plurality of cameras is used in accordance with the second aspect, whereas the evaluation is carried out in a different way.

Typically, however, the first and second aspects of the present disclosure are combined with one another.

Typical configurations of the present disclosure which can develop a surface inspection system both in accordance with the first aspect and in accordance with the second aspect and in accordance with a combination of the first and second aspects are described in greater detail below.

In accordance with one possible configuration, the extent of the device does not exceed the extent of the check field, or exceeds it only insignificantly, i.e., by not more than a factor of 1.5 with respect to the basic area of the surface inspection system measured in a plane parallel to the check field, which affords distinct advantages in applications in practice. The disclosure enables simple handling of the surface inspection system on account of the relatively small dimensions (relative to the check field). Particularly if the available space in front of the object to be checked is limited—as is the case in many industrial applications. In automated applications, moreover, the risk of the surface inspection device colliding with objects from the manufacturing or inspecting environment is significantly reduced.

The small dimensions also result in a low weight and a favorable mass distribution with small moments. In automated applications, this allows high movement and measurement speeds with less force expenditure and higher precision.

Furthermore, the disclosure makes it possible to inspect the surface with the simultaneous image recording of all the cameras of the camera system. Particularly with the use of appropriately bright light sources and short exposure times, the surface inspection can then be carried out during a relative movement of surface to be checked and inspection system.

In accordance with one possible configuration, it is provided that the camera system and the illumination system are arranged with respect to one another in such a way that, alongside at least one first region of the check field in which directional reflections of a light source of the illumination system appear, at least one second region without directional reflections of the light source remains in the recording of the camera, wherein the evaluation system evaluates the recording in the second region.

In accordance with one possible configuration, it is provided that the evaluation system evaluates a plurality of recordings of the surface to be checked, which differ with regard to the position of the camera used to record them with respect to the surface to be checked.

In accordance with one possible configuration, it is provided that the evaluation system assesses a local deviation in the brightness and/or color which is contained in a plurality of recordings as a surface defect if the local deviation in at least one recording appears brighter in at least one first subregion and darker in at least one second subregion than a surface region surrounding the local deviation and/or has different subregions in which different colors are dominant.

In this case, the present disclosure takes account of the fact that more favorable or less favorable conditions for capturing a surface defect may be present depending on the relative position between camera and surface defect. If a local deviation therefore has the structure that is typical of a surface defect in at least one of the images, the local deviation is assessed as a surface defect.

The plurality of recordings of the surface to be checked can be recorded by a plurality of cameras of the camera system which are arranged offset with respect to one another at the surface inspection system. Typically, they are controlled in such a way that the plurality of recordings is recorded simultaneously.

Alternatively or additionally, the plurality of recordings of the surface to be checked can be recorded successively at different positions of the surface inspection system relative to the surface to be checked, a kinematic unit typically being provided, which moves the surface inspection system accordingly. Typically, a controller controls the kinematic unit along a predefined trajectory.

In accordance with one possible configuration, it is provided that the positions of the plurality of cameras of the camera system for the plurality of recordings, by virtue of the setup of the surface inspection system, are offset with respect to one another in such a way that the check field and/or the surface to be checked are/is completely covered by second regions in which no directional reflection of a light source appears.

In accordance with one possible configuration, it is provided that the positions of the cameras for the plurality of recordings, by virtue of control of the kinematic unit of the surface inspection system, are displaced with respect to one another in such a way that the check field and/or the surface to be checked are/is completely covered by second regions in which no directional reflection of a light source appears.

In accordance with one possible configuration, it is provided that the illumination system includes at least two spatially separate regions.

In one possible configuration, the two regions have different colors.

The use of different-colored regions firstly allows that region of the surface to be checked in which favorable conditions are present to be enlarged, since the different colors can be evaluated separately from one another and therefore do not mutually disturb one another. Furthermore, the different colors allow surface defects to be recognized.

In one possible configuration, the regions are arranged on opposite sides of the surface inspection system.

In accordance with one possible configuration, it is provided that the illumination system or its spatially separate regions is/are realized as point type, linear, rod-shaped, ring-shaped or in some other advantageous embodiment and contain(s) one or more areally emitting or point light sources which emit either directionally into a narrow angular range or nondirectionally into a large angular range.

In accordance with a typical configuration, however, the illumination system or its spatially separate regions is/are realized in rod-shaped or ring-shaped fashion and/or include(s) one or more areally emitting light sources which emit nondirectionally into a large angular range.

In accordance with one possible configuration, it is provided that the illumination system has at least two spatially separate and different-colored regions and the camera system contains at least one-color camera having at least two-color channels.

In accordance with one possible configuration, it is provided that the sensitivities of the color channels correspond to the different colors of the illumination system.

In accordance with one possible configuration, it is provided that the brightness distribution generated by the spatially separate, different-colored regions of the illumination device is recorded simultaneously and independently of one another over the different color channels of the camera and/or is evaluated by the evaluation system. In particular, in this case, in each color channel it is possible to evaluate whether a local deviation in the brightness has a first region in which the deviation is brighter and a second region in which the deviation is darker than surroundings of the deviation.

In accordance with one possible configuration, it is provided that the evaluation system assesses a local deviation in the brightness as a surface defect if the local deviation appears brighter or darker in at least one first subregion in a first color channel and in at least one second subregion in a second color channel than a surface region surrounding the local deviation.

In accordance with one possible configuration, it is provided that the illumination system has at least three spatially separate and different-colored regions and the camera system contains at least one color camera having at least three color channels, In one possible configuration, the spatially separate regions form a frame.

In one possible configuration, the frame has a first color on a first side and a second, different color on an opposite second side.

In one possible configuration, regions likewise having the first or the second color are respectively provided on a third and/or fourth side of the frame, these regions typically being arranged at a distance from the respective first or second side with the same color.

In one possible configuration, the remaining regions of the third and fourth sides have a third color. In particular, a region with the third color is provided here in each case between the first side and the further region with the first color and between the second side and the further region with the second color.

In accordance with one possible configuration, it is provided that the simultaneous image recording of all the cameras of the camera system is sufficient for fully inspecting the check field.

In accordance with one possible configuration, it is provided that the surface inspection system has an extent that is not larger than 1.5 times the extent of the check field, relative to the basic area of the surface inspection system in a plane parallel to the check field.

In accordance with one possible configuration, it is provided that a plurality of regions of the illumination system are arranged in a manner rotated by an angle with respect to one another relative to the check field.

In accordance with one possible configuration, it is provided that two regions of the illumination system are arranged in a manner rotated by 90° with respect to one another relative to the check field, wherein typically the regions of the illumination system extend in rod-shaped fashion along an edge of the surface inspection system.

In accordance with one possible configuration, it is provided that the cameras of the camera system are situated within an area enclosed by regions of the illumination system, wherein the regions of the illumination system typically extend in rod-shaped fashion along an edge of the surface inspection system.

In accordance with one possible configuration, it is provided that the surface inspection system includes a kinematic unit that allows the surface inspection system to be movable relative to the surface to be checked.

In accordance with one possible configuration, it is provided that the kinematic unit is controlled along a predefined path by a controller. In particular, the surface inspection system can thus be guided over a surface to be checked which is larger than the check field.

In accordance with one possible configuration, it is provided that the checking is effected during a relative movement of the surface inspection system with respect to the surface to be checked.

In accordance with one possible configuration, it is provided that the surface inspection system forms a structural unit with a 3D measurement system, in particular with a stripe projection system.

In accordance with one possible configuration, it is provided that a camera of the 3D measurement system is surrounded by cameras of the camera system and/or regions of the illumination system of the surface inspection system.

The surface inspection system can be used for checking components. Typically, the surface inspection system is configured in such a way that it carries out the checking of a component in an automated manner.

The surface inspection system can be embodied in such a way that it automatically captures and outputs surface defects.

The surface inspection system is typically embodied in such a way that it can capture even relatively small surface defects which extend over only a few pixels. In particular, the surface inspection system can be embodied in such a way that it can capture surface defects which extend over fewer than 100 pixels, typically over fewer than 50 pixels, more typically over fewer than 20 pixels.

The surface inspection system is typically embodied in such a way that it captures only relatively small surface defects. In particular, the evaluation system can be configured in such a way that regions with deviating brightness and/or color which exceed a predefined size are not assessed as surface defects. It is more likely that such regions involve desired changes in the shape of the surface, rather than surface defects.

The surface inspection system can include an output unit, on which captured surface defects are displayed. By way of example, it is possible to display the position of captured surface defects on a representation of a component to be checked. The output unit can include a screen for this purpose.

The evaluation system and the controller which are used in the context of the present disclosure capture the surface defects typically automatically in one or more measurement passes. They typically include a microprocessor and a non-volatile memory on which is stored a computer program having instructions which are executed on the microprocessor in order to make available the functions of the evaluation system and/or of the controller described in the context of the present application. In particular, therefore, the evaluation system and the controller are configured and programmed to carry out the functions. The evaluation system and the controller are connected to the camera system and the illumination system and also, if present, the kinematic unit in order to evaluate the data thereof and/or to control them.

The present disclosure furthermore encompasses a method for capturing surface defects of a surface to be checked by way of a surface inspection system including a camera system and an illumination system, wherein the illumination system generates, together with the reflection and scattering properties of the surface to be checked, a brightness and/or color distribution in which surface defects become visible as local deviations in the brightness and/or color, said distribution being detected by the camera system.

In accordance with a first aspect, the method is characterized by the fact that a local deviation in the brightness and/or color is assessed as a surface defect if the local deviation appears brighter in at least one first subregion and darker in at least one second subregion than a surface region surrounding the local deviation, and/or wherein different colors are dominant in different subregions.

In accordance with a first aspect, the method is characterized by the fact that the surface to be checked is in each case completely or partly imaged by at least two cameras, wherein the cameras and the light source or light sources of the illumination system are arranged with respect to one another and with respect to the surface to be checked in such a way that the directional reflections of the light source for each camera appear at different locations of the surface to be checked.

The two aspects are initially independent of one another but can be combined with one another.

The method is typically carried out in a manner such as has already been described in greater detail above in respect of the surface inspection system according to the disclosure.

In particular, the method is implemented using one of the surface inspection systems described in greater detail above and below.

BRIEF DESCRIPTION OF THE DRAWINGS

FIG. 13 shows a first exemplary embodiment of a surface inspection system in accordance with the prior art, and FIG. 14 shows a second exemplary embodiment of a surface inspection system in accordance with the prior art.

DESCRIPTION OF EXEMPLARY EMBODIMENTS

Exemplary embodiments of the disclosure are described in greater detail below. Where apparently expedient, the description is elucidated by drawings.

Figure 1:
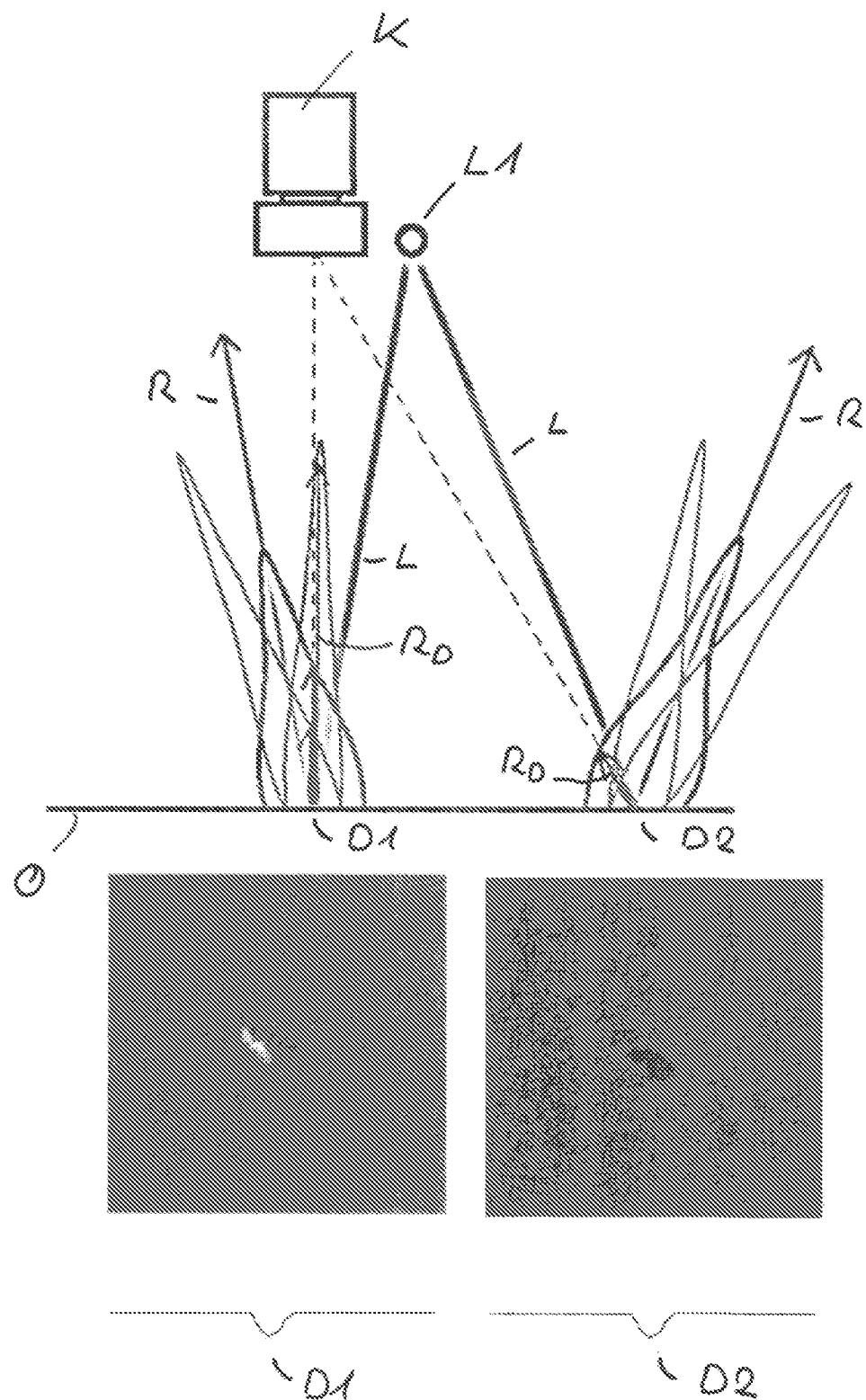
FIG. 1 shows a schematic diagram concerning the dependence of the reflected quantity of light on the angle between camera, light source and position on the surface to be checked in the case of a first exemplary embodiment of a surface inspection system according to the present disclosure, two result images of surface defects and an illustration of the course of the surface in the region of the surface defects.

FIG. 1 shows a first exemplary embodiment of a surface inspection system according to the disclosure in a schematic diagram. The surface inspection system includes a camera system including a camera K and an illumination system including a light source L1. The light source L1 illuminates the surface O to be checked and generates, together with the reflection and scattering properties of the surface to be checked, a brightness distribution which is recorded by the camera system and evaluated by an evaluation system (not illustrated in more specific detail).

The surface O has two surface defects D1 and D2, the contour of which is illustrated in a sectional illustration at the very bottom of FIG. 1. In this case, the surface defects are for example small embossing defects at which the surface has been indented at points, such that the defect has opposing, relatively steep flanks.

In order to explain the behavior of such defects that is utilized in accordance with the first aspect of the present disclosure, FIG. 1 illustrates a respective light beam L that emanates from the light source L1 and illuminates the first and respectively the second surface defect D1, D2. Furthermore, R represents the direction of a corresponding directional reflection of said light beam L in the case of a planar surface such as is present in the region around the surface defect. The brightness distribution in directions which deviate from the direction of the directional reflection R is likewise illustrated. As is clearly discernible, light is radiated most in the direction of the directional reflection, while the light radiated into other angular ranges rapidly becomes less as the angle increases. Furthermore, the two brightness distributions for reflections at the two flanks of the surface defect are also illustrated besides the brightness distribution for the reflection in the case of a planar surface. Furthermore, the three arrows RD depict the brightness of the light which is reflected from these three regions in each case in the direction of the camera K.

In the case of the first surface defect D1 illustrated on the left, one flank is arranged and oriented relative to the light source L1 and the camera K in such a way that it reflects the light of the light source L1 almost directionally toward the camera, such that this flank appears significantly brighter than the surroundings of the surface defect. By contrast, the light is reflected directionally from the opposite flank in a direction which has a significantly larger angle with respect to the direction of the camera, such that the light reflected toward the camera is significantly darker than the surroundings. Therefore, a first region which is brighter than the surroundings and a second region which is darker than the surroundings arise in the region of the surface defect.

By contrast, in the case of the second surface defect D2 illustrated on the right, both flank regions are darker than the region surrounding the surface defect owing to the less favorable angular relationships. In addition, the difference in brightness overall is significantly smaller. In this view, therefore, the surface defect cannot be differentiated from a location which reflects less well owing to an increased roughness, for example.

By contrast, owing to the different regions which are in one instance brighter and in one instance darker than the surroundings, the first surface defect D1 is unambiguously recognizable as an imperfection concerning the shape of the surface, since this brightness distribution represents a typical signature for an imperfection having two flanks.

In accordance with the first aspect of the present disclosure, the evaluation system therefore evaluates the image from the at least one camera K and categorizes as surface defects local deviations in the brightness which have a first region which is brighter than the surroundings and a second region which is darker than the surroundings. By contrast, local deviations in the brightness which are altogether darker or altogether brighter than the surroundings are not classified as a surface defect since they could also be local deviations in the reflection or scattering properties.

If a plurality of separate regions of the illumination system with different colors are used, the individual flanks of a surface defect reflect them to different extents in each case, given appropriate angular relationships. This aspect, too, can be used in the context of the second aspect as a signature by which the evaluation system recognizes a surface defect. If a local deviation therefore has a plurality of regions in which the different colors have different brightnesses, the presence of a surface defect can also be deduced from this.

In this case, the procedure described last, in which the different color channels are not evaluated separately, rather the result images from the different color channels are compared with one another, can either be used instead of an evaluation in accordance with the signature described first. Typically, however, it supplements such an evaluation.

As is likewise evident from the comparison of the two imperfections D1 and D2, for each of which representations of the resulting image are inserted in FIG. 1, the capturability of the imperfections here is crucially dependent on the angular relationships between the light source, the surface defect and the camera. In this case, particularly favorable possibilities for capturing surface defects are present in second regions of the surface which directly adjoin first regions with directional reflection of the light source into the camera. By contrast, if the imperfections lie in third regions which are further away from such first regions with directional reflection, the capturability of surface defects becomes significantly more difficult. The second regions with favorable angular properties extend on both sides of the first regions with directional reflection. Since the angular relationships become gradually less well suited, typically regions up to a maximum distance of 10 cm and/or 20% of the working distance between surface inspection system and surface to be checked, more typically 6 cm and/or 15% of the working distance between surface inspection system and surface to be checked, are regarded as second regions which are well suited to capturing surface defects. Regions that are further away therefore constitute third regions with unfavorable angular properties.

Therefore, if only one camera and one light source are present, the measurement region in which it is possible to capture surface defects is relatively small. One possibility for nevertheless capturing surface defects in a larger region of the surface using only one light source and only one camera consists, then, in moving the surface inspection system relative to the surface and thereby successively scanning the surface with the region that is favorable for capturing the surface defects. As a result, a plurality of recordings of the surface are accordingly created, which differ with regard to the position of the camera relative to the surface and in which there are accordingly also other angular relationships between the light source, the respective surface defect and the camera.

Figure 2:
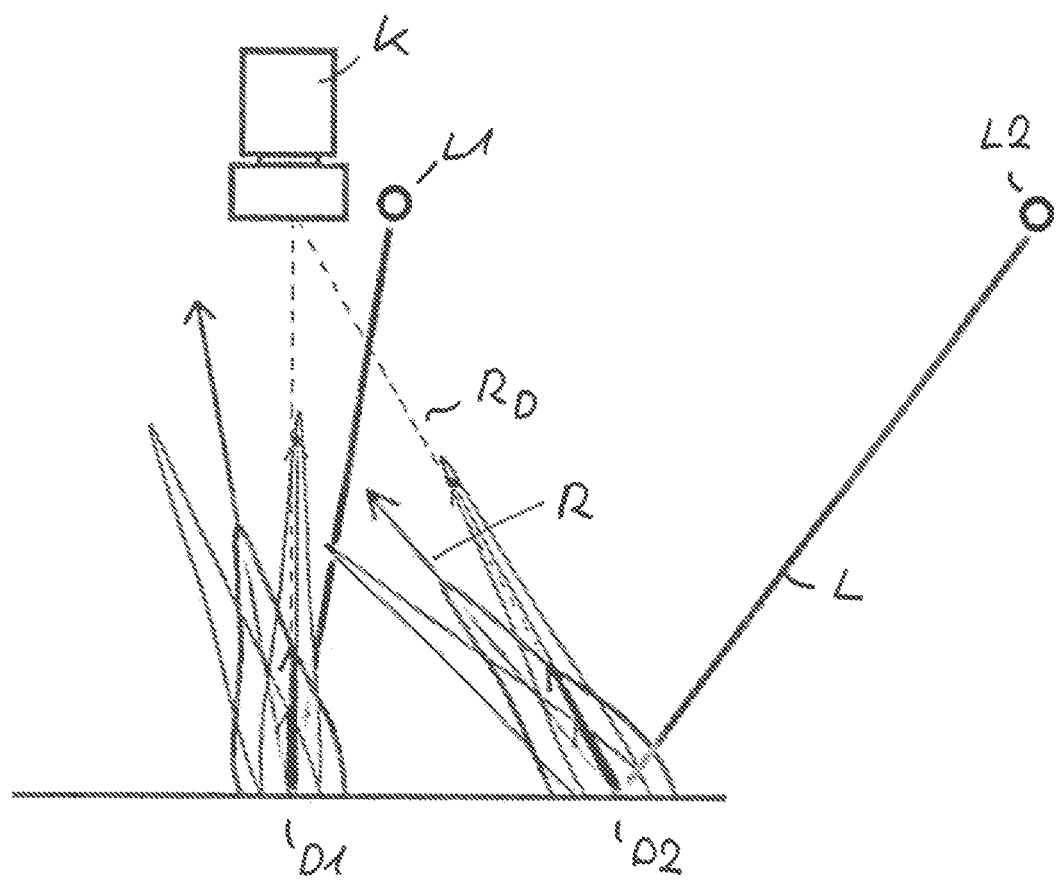
FIG. 2 shows a schematic diagram concerning the dependence of the reflected quantity of light in the case of a second exemplary embodiment of a surface inspection system according to the present disclosure.

By contrast, if the region that is particularly suitable for capturing surface defects and is made available by the stationary surface inspection system is intended to be enlarged, as shown in FIG. 2 in a first possibility a further light source L2 can be used, which illuminates the surface to be checked and produces a region of directional reflection at a different location in relation to the camera K. This results in additional regions with favorable angular relationships between light source, surface region and camera. In FIG. 2, therefore, the second surface defect D2 can likewise be captured well by the light source L2. In order that the two light sources do not mutually disturb one another, they typically have different colors and/or are controlled successively.

As likewise evident from FIG. 2, however, a very large distance between the light source L2 and the camera is needed to produce favorable angular properties for the second surface defect D2. Such a configuration therefore results in large dimensions of the surface inspection system in comparison with the check field.

Figure 3:
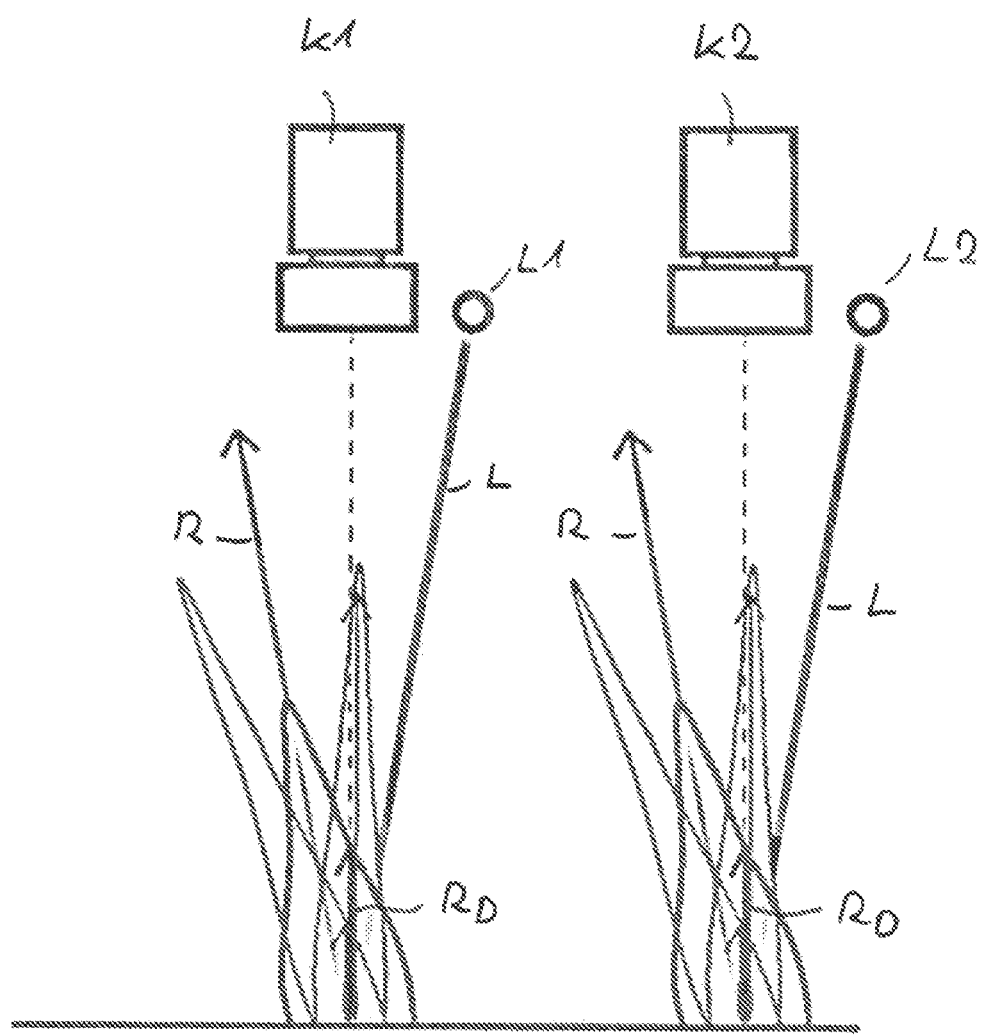
FIG. 3 shows a schematic diagram concerning the dependence of the reflected quantity of light in the case of a third exemplary embodiment of a surface inspection system according to the present disclosure, in which two cameras are used in accordance with the second aspect.

Therefore, FIG. 3 shows an exemplary embodiment of a surface inspection system in accordance with the second aspect of the present disclosure, in which the camera system has at least two cameras K1 and K2. In the exemplary embodiment, said cameras cooperate with two light sources L1 and L2. However, it would also be conceivable for only one light source L1 to be used. The second camera K2 results in at least one further region with favorable angular properties in which surface defects can be captured well. If a plurality of light sources is additionally used, this may result in even further favorable regions. Here, too, light sources which have different colors or are controlled successively are typically used in order to avoid mutual disturbance. The further camera requires significantly less space to provide favorable angular relationships, in contrast to the use of a further light source as illustrated in FIG. 2.

Figure 4:
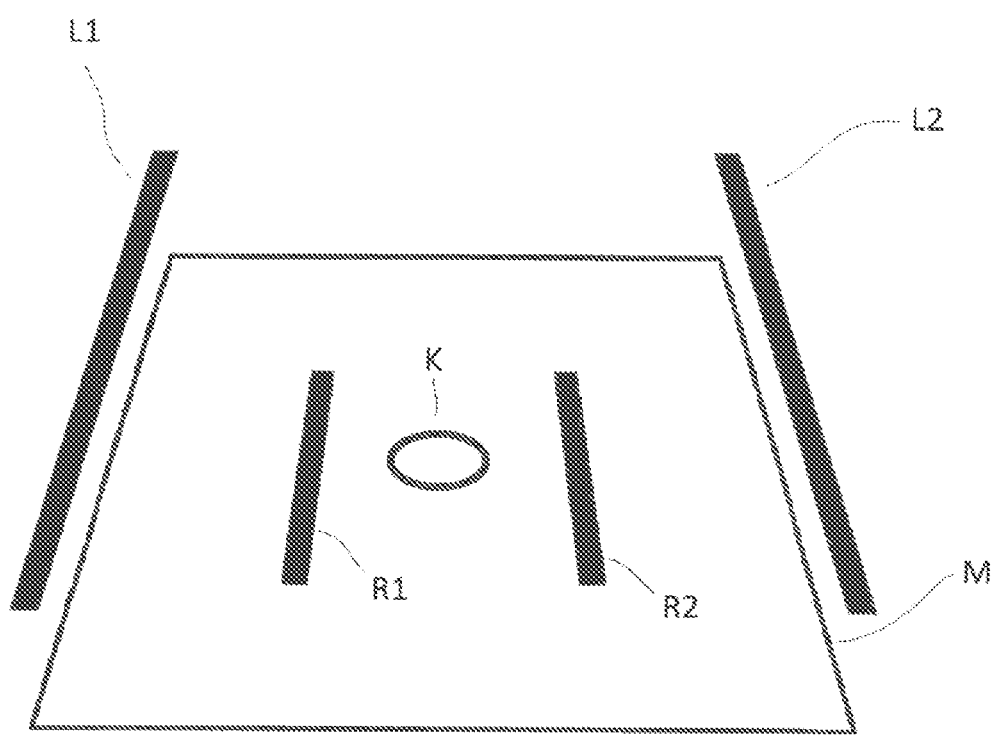
FIG. 4 shows a schematic diagram concerning the distribution of the regions with directional reflection within the check field when only one camera is used.

The effect resulting from the use of a plurality of cameras in regard to the regions that are favorable for capture is elucidated once again with reference to FIGS. 4 and 5. FIG. 4 here shows an exemplary embodiment with one camera and two light sources L1 and L2 arranged on opposite sides of the camera K. This results in two regions R1 and R2 with direct reflection of the light elements L1 and L2 into the camera. The regions that are favorable for capturing surface defects are arranged in a manner adjoining these regions with direct reflection and therefore cover only a small part of the check field M. In the case of the exemplary embodiment in FIG. 5, by contrast, with the same arrangement of two light sources L1 and L2, the use of a plurality of cameras K1-K6 results in a very much larger region of the measurement field M with favorable measurement conditions, since the corresponding regions R1-R6 with directional reflections are distributed over the entire measurement field.

The concept underlying the first aspect of the present disclosure is explained once again below with reference to FIG. 6, which shows the configuration in accordance with FIG. 5 in a side view with only three cameras.

Figure 6:
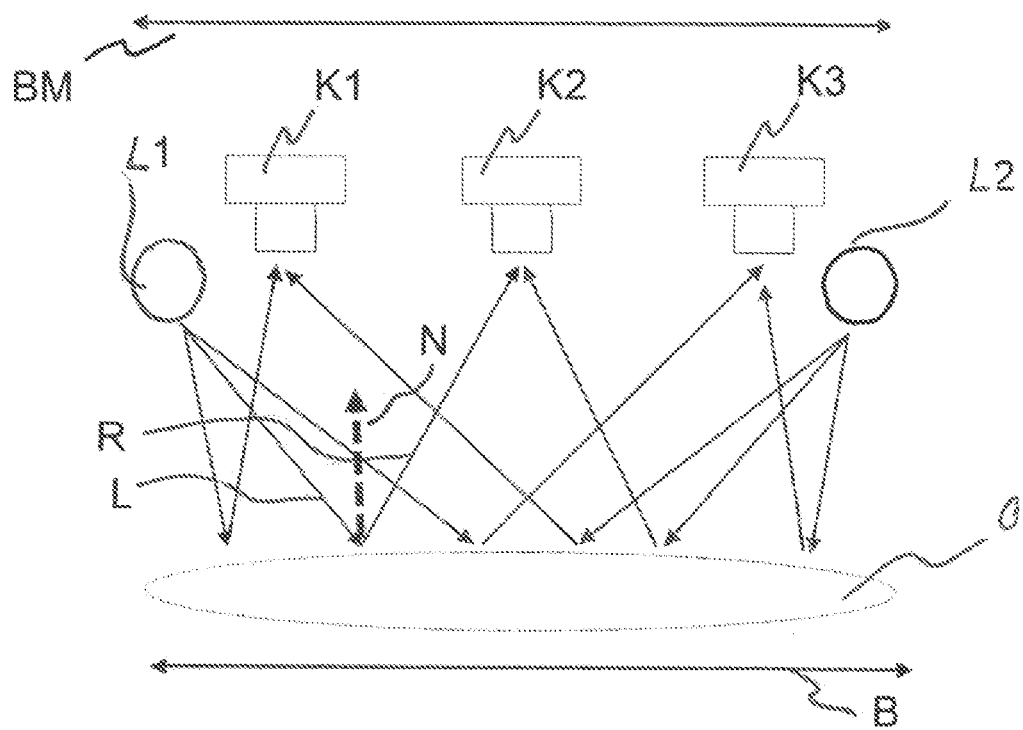
FIG. 6 shows a side view with the beam path in the case of the configuration in accordance with FIG. 5.

FIG. 6 shows an exemplary embodiment of a surface inspection system according to the disclosure including a camera system including a plurality of cameras, e.g., three cameras (K 1, K2; K3), and an illumination system. In this case, it is advantageous if the illumination system consists of a plurality of spatially separate regions or light sources (L1, L2). For each region of the illumination system and each camera of the camera system, the geometric condition for a directional reflection (angle of incidence=angle of reflection relative to the surface normal) is satisfied at a different location of the surface to be checked. In the case of a lustrous surface, for each possible combination of camera and region of the illumination system this then results in a continuous brightness distribution which has its maximum where the reflection condition is satisfied. If a surface defect—e.g., a local deviation of the surface normal or of the scattering properties—is situated in the region of said brightness distribution, this leads to a local variation in the brightness distribution which is generated by the respective region of the illumination system in the respective camera. By way of appropriate arrangement of the cameras and the regions of the illumination system, the subregions of the surface to be checked, in each of which a combination of camera and illumination region permits detection of surface defects, can be distributed over the entire surface to be checked. In this case, in contrast to the methods from the prior art, it is not necessary for the extent of the surface inspection system (BM) to exceed the extent of the surface (B) to be checked.

In one advantageous embodiment, brightness distributions generated by the different regions or a part of the spatially separate regions of the illumination system in a camera are captured independently of one another. Then a superposition of the brightness distributions of different spatially separate regions of the illumination system on a camera is excluded and the local brightness deviations caused by surface defects have the highest contrast.

Independent capture can be affected with temporally successive camera recordings, for example, for each of which only one of the spatially separate regions of the illumination system is active. Typically, a corresponding controller is provided for this purpose, and correspondingly controls the regions of the illumination system. It is advantageous, however, to implement the spatially separate regions or a part thereof in different colors. If the cameras of the illumination system are implemented as color cameras and the colors of the illumination system are chosen according to the different sensitivities of their color channels, the brightness distributions generated by the different-colored regions of the illumination system can be captured simultaneously and the entire surface to be checked can be inspected by way of one recording of the camera system.

Figure 7A:
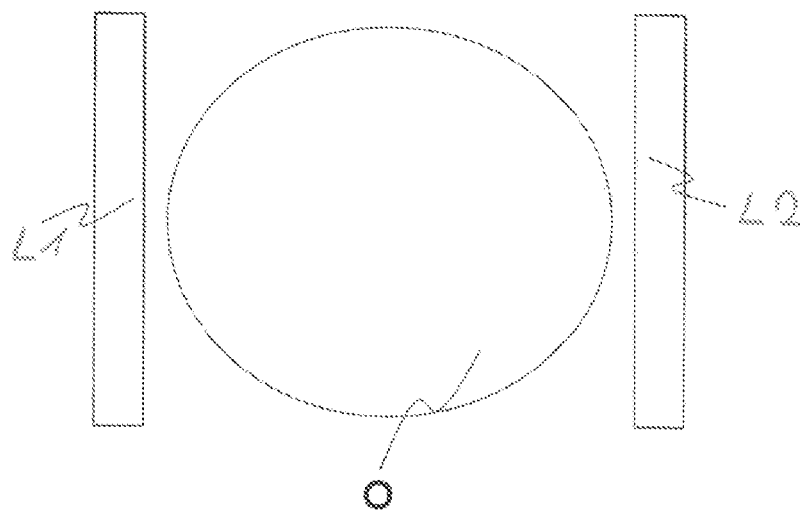
FIG. 7A shows a schematic diagram concerning the arrangement of two regions of the illumination system relative to the check field.
Figure 7B:
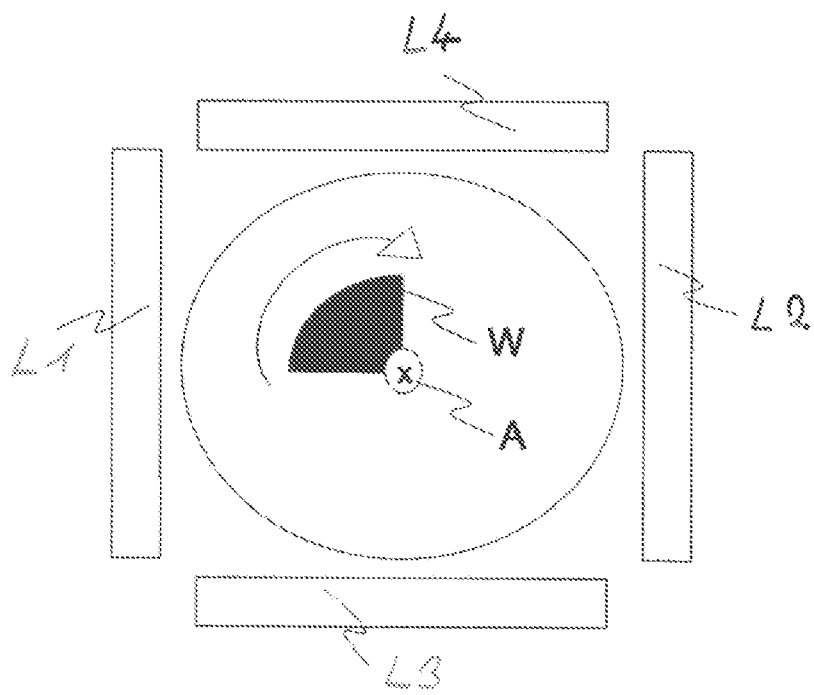
FIG. 7B shows a schematic diagram concerning the arrangement of four separate regions of the illumination system with respect to the check field.

FIG. 7 shows a further advantageous embodiment, in which the different regions of one illumination system or of two illumination systems are arranged in a manner rotated by 90° relative to the surface to be checked. The figure shows the front view of the check field and the surface (O) to be checked from the viewing direction of the surface inspection system. FIG. 7A illustrates the exemplary embodiment by way of example on the basis of an illumination system consisting of two rod-shaped regions (L1 and L2) situated by way of example at two opposite edges of the check field. In the exemplary embodiment shown in FIG. 7B, at least one second illumination system (L3 and L4) rotated relative to the check field by the angle W=90° relative to the axis A is additionally present. Two rod-shaped regions (L3 and L4) are provided here, too, which are situated by way of example at the remaining two opposite edges of the check field.

In the case of such an arrangement, it is possible to detect direction-dependent surface defects with a higher contrast. In this case, the illumination systems or parts thereof can be embodied as described above, e.g., in different shapes (e.g., rings, ring segments, etc.) and consist of different light sources (flash lamps, LEDs, etc.). Typically, the light sources emit the light nondirectionally.

Figure 5:
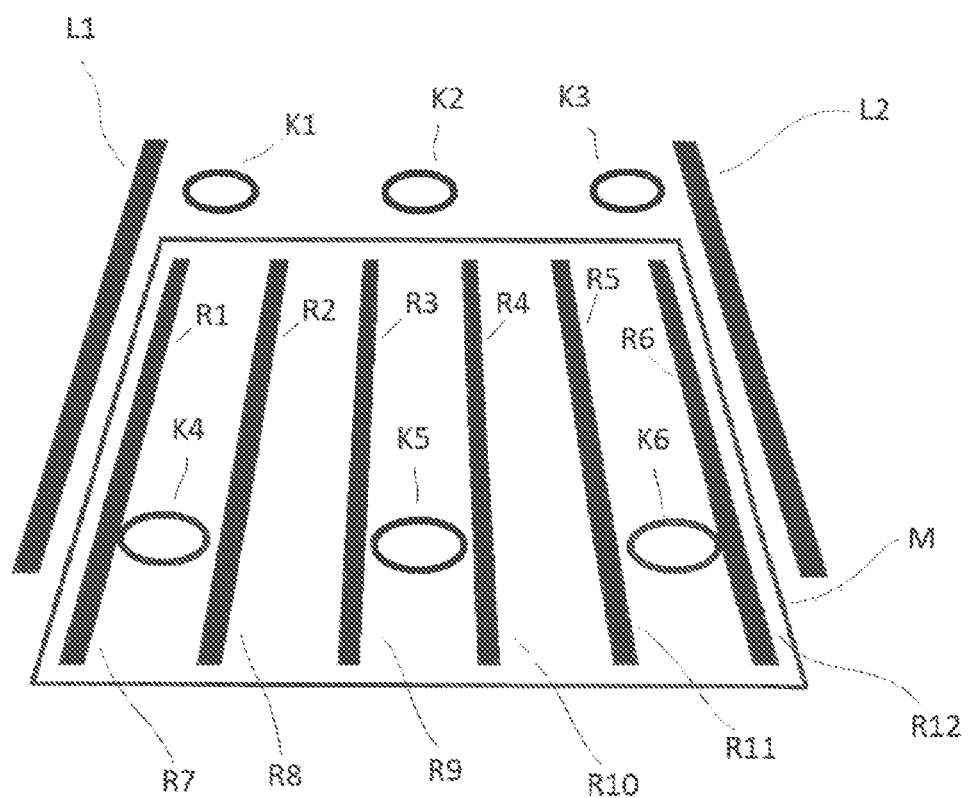
FIG. 5 shows a systematic diagram concerning the distribution of the directional reflections in the check field in the case of an exemplary embodiment of a surface inspection system in accordance with the second aspect with a plurality of cameras.
Figure 8:
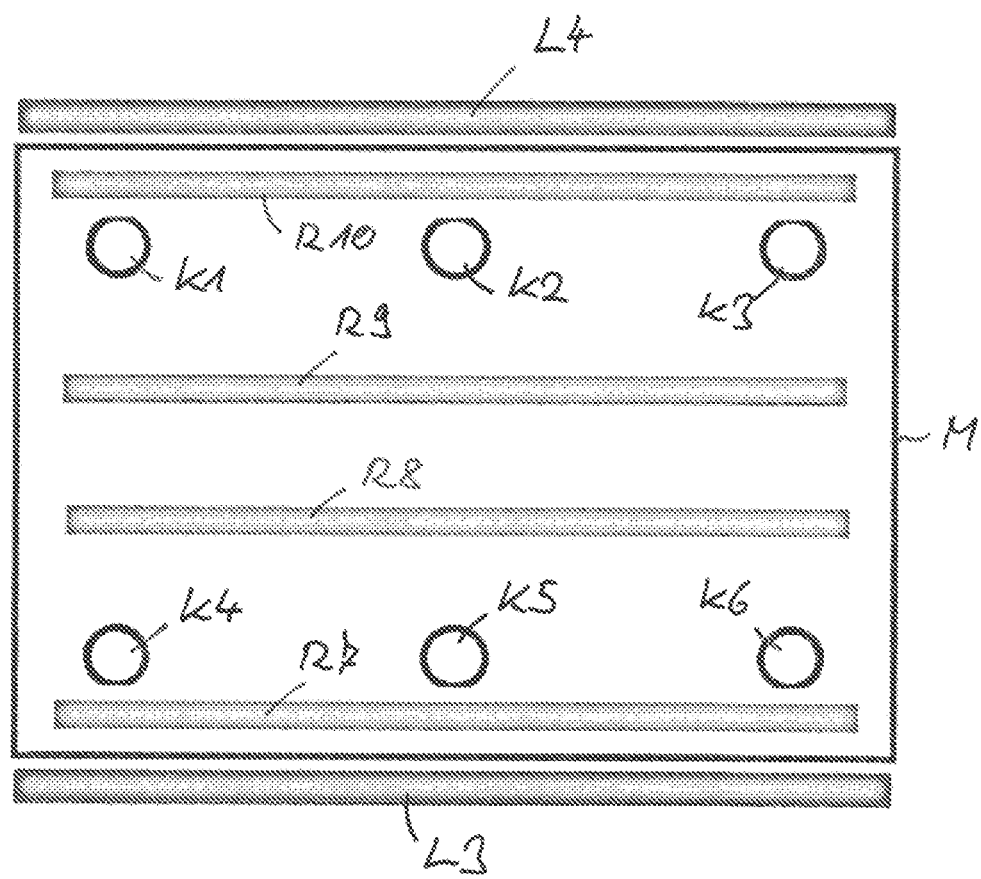
FIG. 8 shows a schematic diagram concerning the distribution of the directional reflections in the check field with the use of additional regions of the illumination system which run perpendicularly to those from FIG. 5.

FIG. 8 shows the light distribution that arises in the case of a camera arrangement including six cameras K1-K6, as shown in FIG. 5, for example, if only the light sources L3 and L4 respectively extending along the longitudinal sides are taken into account. The arrangement of the cameras in two rows here results in the four regions R7-R10 with directional reflection, which are likewise arranged in a manner distributed over the measurement field M.

Figure 9:
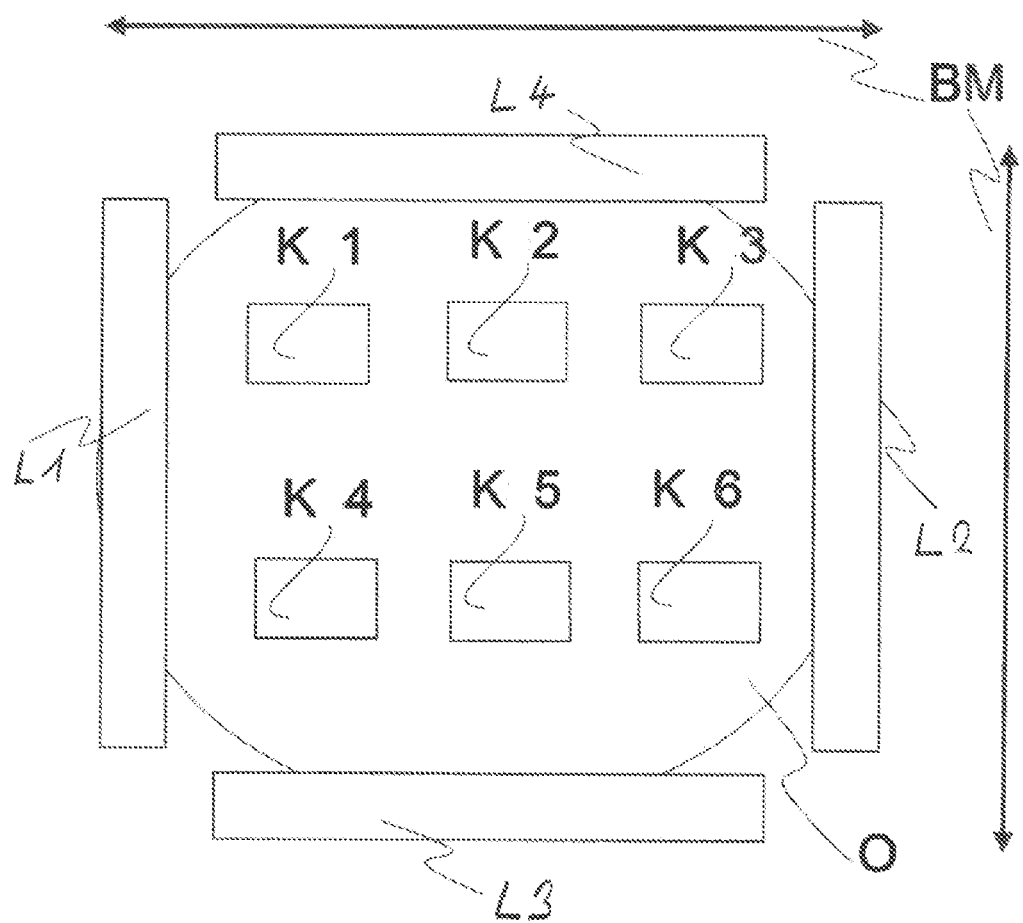
FIG. 9 shows a schematic illustration of an exemplary moment with six cameras and four separate regions of the illumination system.

Typically, the plurality of cameras K1-K6 are combined with light sources which extend along the edges of the measurement field, as is illustrated schematically once again in FIG. 9.

FIG. 9 shows an example of an advantageous embodiment in which the cameras of the camera system (K1-K6) are situated within the area delimited by the illumination system (L1 to L4). As a result, the extent of the surface inspection system can be kept very small.

As described above, unlike in the prior art, the disclosure allows the detection of surface defects within a check field whose extent (O) corresponds at least to the extent of the surface inspection device (BM). As described further above, that has crucial advantages in applications in practice. A device including six cameras is shown by way of example in FIG. 9.

Figure 10:
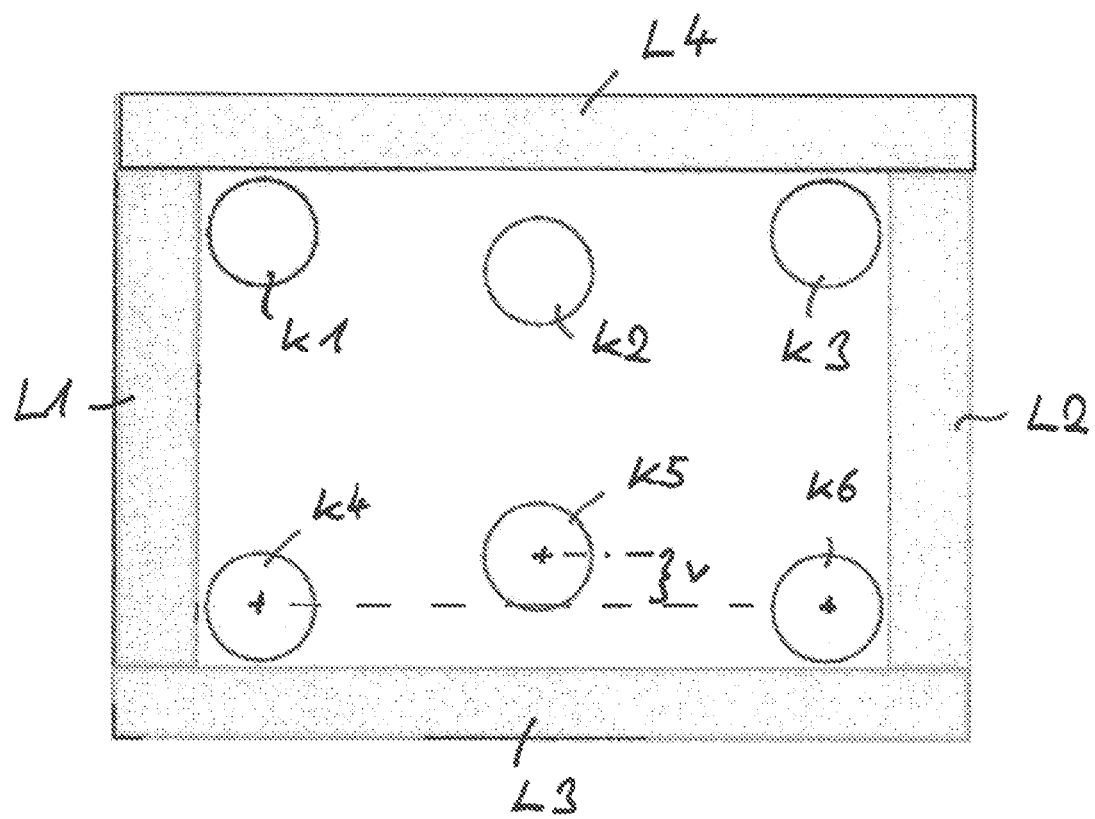
FIG. 10 shows an exemplary embodiment with a partly offset arrangement of the cameras, this exemplary embodiment being based on the fundamental setup in accordance with FIG. 9.

FIG. 10 shows the exemplary embodiment with six cameras illustrated as a schematic illustration in FIG. 9, with the exact positioning of the cameras now being represented. In particular, the cameras here are not arranged exactly one above another or next to one another in a grid of columns and rows, but rather are at least partly displaced relative to the grid. As a result, the regions with directional reflection for the individual cameras are once again displaced relative to one another.

In the case of the exemplary embodiment with six cameras shown in FIG. 10, here the cameras K2 and K5 arranged centrally within the rows of three are the ones which are displaced by a distance v relative to a connecting line that connects the cameras K1, K3 and K4, K6 respectively surrounding them on both sides. By comparison with the illustration of the regions with directional reflection as shown in FIG. 8, this results in a better coverage of the measurement field since the cameras displaced relative to the grid produce additional regions with directional reflections. In the exemplary embodiment, the cameras K2 and K5 here are each displaced toward one another relative to the grid. Alternatively or additionally, the cameras K2 and K5 could also be displaced relative to one another with regard to their position in the direction of the connecting line.

In principle, all the cameras could in each case be displaced by different vectors relative to the positionings within a regular grid in order to further intensify this effect. At the same time, however, the cameras are also intended to cover the largest possible check field. Therefore, in the exemplary embodiment shown in FIG. 10, a configuration was chosen in which the cameras K1, K3, K4, and K6 arranged in the corners are respectively arranged at the corners of a rectangle and only the two middle cameras K2 and K5 are arranged in a manner displaced relative to this rectangle.

As already described above, for the separate regions L1-L4 of the illumination system, which in some instances are also referred to as light sources in the context of the present application, different colors are used in order to avoid mutual disturbance during simultaneous recording. Alternatively, the light sources can also emit light successively and thus likewise allow a separate evaluation. Within the respective region, by contrast, the separate regions L1-L4 of the illumination system do not have a pattern used for the measurement or evaluation. However, possible production dictated brightness fluctuations in the regions are not harmful either.

In the case of the configuration with four separate regions L1-L4 as illustrated in FIG. 10, with the use of different colors, four color channels would be required for an optimum configuration. If the camera has four color channels, four different colors can therefore be used.

Figure 11:
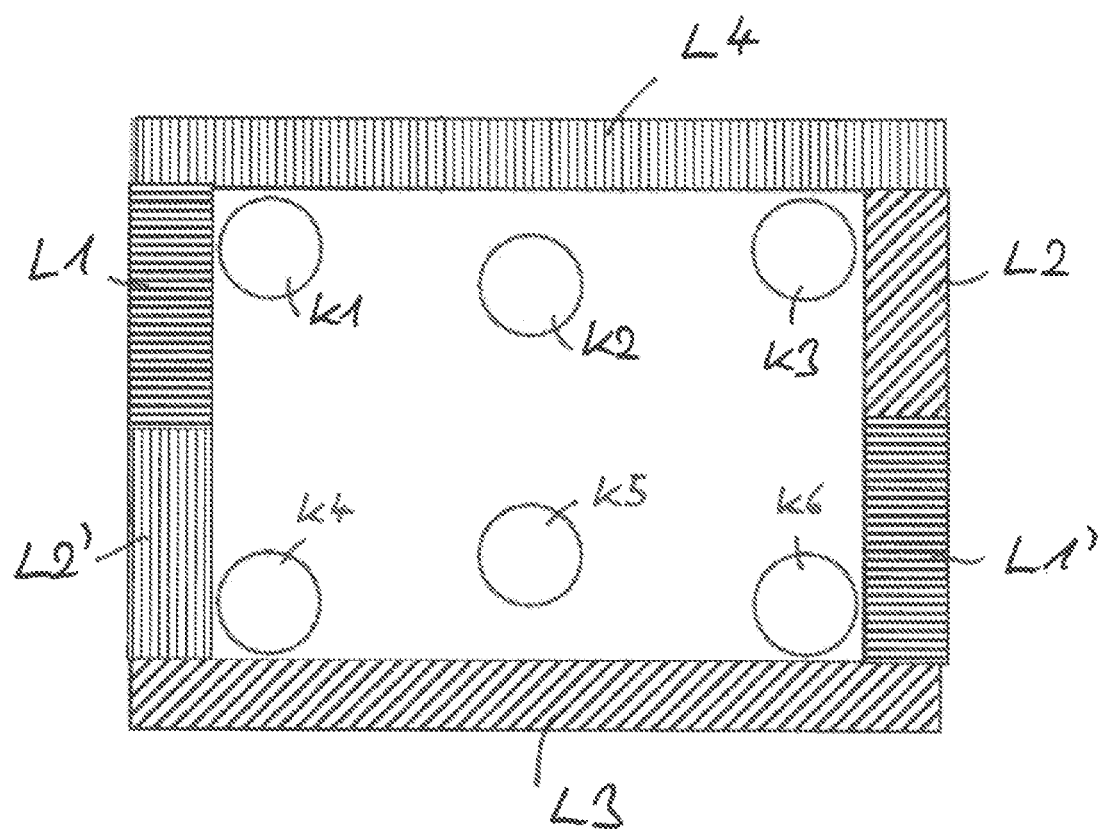
FIG. 11 shows the exemplary embodiment illustrated in FIG. 10 with a plurality of separate regions of the illumination system which emit in three different colors.

Commercially available cameras usually have only three color channels, however. Therefore, FIG. 11 shows a configuration which manages with only three different colors and nevertheless substantially prevents the separate regions of the illumination system from mutually influencing one another.

In this case, the regions L3 and L4 arranged on opposite sides of the surface measuring system in the exemplary embodiment have different colors. In this case, they each extend along the entire side. In the exemplary embodiment, these regions L3 and L4 are provided on the longer sides along which three cameras are arranged. On the transverse sides, a region L2 is then provided, which has the same color as the region L3, but is arranged at a distance from the latter and adjacently to the region L4. Conversely, a region L2' is provided, which has the same color as the region L4 and is arranged at a distance from the latter and adjacently to the region L3. The remaining regions L1 and L1' have the third color.

In this case, the exemplary embodiment provides for the two regions L2 and L2' to be provided on opposite sides of the surface inspection device. Accordingly, the regions L1 and L1' with the third color in each case separate the identically colored regions L3, L2 and L4, L2', respectively, from one another. Alternatively, it would be conceivable to arrange the two regions L2 and L2' adjacently to one another on one side and to allow the opposite side to radiate in the third color throughout.

The number of cameras used is crucially determined by the measurement field which is intended to be attained. It therefore goes without saying that configurations including fewer cameras, for example two, three or four cameras, or including more cameras, for example 8 or nine cameras, are also conceivable.

Figure 12:
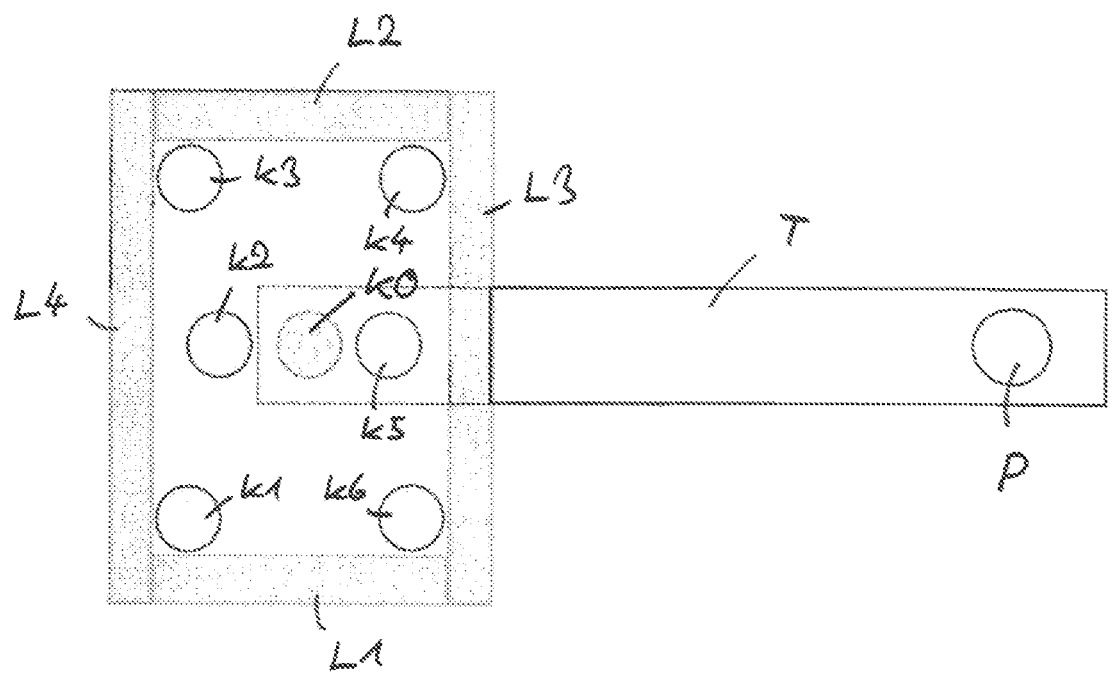
FIG. 12 shows a schematic illustration of an exemplary embodiment of a surface inspection system in accordance with the disclosure which has been combined with a 3D measurement system.

FIG. 12 shows an exemplary embodiment of a surface inspection device according to the disclosure which has been combined with a 3D measurement device and forms a structural unit therewith. In particular, in this case, the camera K0 of the 3D measuring device is arranged in the region of the surface inspection device and in particular within the camera system and/or illumination system of the surface inspection device. In the exemplary embodiment, a separate camera is used for the 3D measuring device, said separate camera typically being a monochrome camera since the latter is significantly faster than color cameras. However, it would also be conceivable for one of the cameras of the surface inspection device to be used for the 3D measurement as well. Typically, the 3D measuring device and the surface inspection device have the same check field. With further preference, these can be used either simultaneously or intermittently to capture a surface.

In the case of the exemplary embodiment shown in FIG. 12, the 3D measuring device is a measuring device which operates with a projector P arranged on a base T, which then carries the surface inspection device on the opposite side. In particular, that involves a stripe projection device.

The evaluation system—not illustrated in more specific detail—of the surface inspection device typically captures surface defects automatically. It typically has an output unit, which outputs said surface defects.

By way of example, in this case, the output device can graphically represent the position of the surface defects on a component.

The evaluation system of the surface inspection device captures surface defects in a possible configuration exclusively on the basis of the brightness distribution with the aid of the above-described typical signatures of such defects. In particular, no a priori knowledge about the shape of the surface to be measured is used for this capture. Furthermore, the capture is effected in this exemplary embodiment without any comparison of the captured brightness distribution with a predefined brightness distribution.

However, the evaluation system can output the results of the 3D measurement, which are typically compared with CAD data of the component to be measured, in combination with the results of the surface inspection.

In this case, the surface inspection device supplements the 3D capture and makes it possible to reliably capture surface defects that can usually be recognized by a 3D measurement system only with difficulty.

It is understood that the foregoing description is that of the exemplary embodiments of the disclosure and that various changes and modifications may be made thereto without departing from the spirit and scope of the disclosure as defined in the appended claims.

What is claimed is:

1. A surface inspection system for detecting surface defects of a surface to be checked, the surface inspection system comprising:
 a camera system;
 an illumination system; and
 an evaluation system,
 wherein the camera system captures illumination emitted by the illumination system and reflected by the surface to be checked in at least one image captured by the camera system,
 wherein the evaluation system evaluates at least one of a brightness distribution and a color distribution of the surface to be checked in the at least one image captured by the camera system and determines surface defects of the surface to be checked as local deviations in at least one of a brightness and a color, and
 wherein the evaluation system determines at least one of:
 (a) that a local deviation in the brightness is a surface defect when the local deviation appears brighter in at least one first subregion and darker in at least one second subregion than a surface region surrounding the local deviation, and
 (b) that a local deviation in the color is a surface defect when a first color channel of a plurality of color channels of the camera system is brighter than a remainder of the plurality of color channels in at least one first subregion and a second color channel out of the plurality of color channels of the camera system is brighter than a remainder of the color channels in at least one second subregion,
 wherein the illumination system includes one or more light sources,
 wherein the camera system includes at least two cameras which completely or partly image the surface to be checked,
 wherein the at least two cameras and one or more light sources of the illumination system are arranged with respect to one another in such a way that directional reflections of the light source or light sources for each camera appear at different locations of a check field of the surface inspection system,
 wherein the camera system and the illumination system are arranged with respect to one another such that, alongside at least one first region of the check field in which the directional reflections of the light source or light sources of the illumination system appear, at least one second region without directional reflections of the light source or light sources remains in the recording of the camera, and
 wherein the evaluation system evaluates the recording in the second region.

2. A surface inspection system for detecting surface defects of a surface to be checked, the surface inspection system comprising:
- a camera system;
- an illumination system; and
- an evaluation system,
- wherein the camera system captures illumination emitted by the illumination system and reflected by the surface to be checked in at least one image captured by the camera system,
- wherein the evaluation system evaluates at least one of a brightness distribution and a color distribution of the surface to be checked in the at least one image captured by the camera system and determines surface defects of the surface to be checked as local deviations in at least one of a brightness and a color, and
- wherein the evaluation system determines at least one of:
- (a) that a local deviation in the brightness is a surface defect when the local deviation appears brighter in at least one first subregion and darker in at least one second subregion than a surface region surrounding the local deviation, and
- (b) that a local deviation in the color is a surface defect when a first color channel of a plurality of color channels of the camera system is brighter than a remainder of the plurality of color channels in at least one first subregion and a second color channel out of the plurality of color channels of the camera system is brighter than a remainder of the color channels in at least one second subregion,
- wherein the illumination system includes one or more light sources,
- wherein the camera system includes at least two cameras which completely or partly image the surface to be checked,
- wherein the at least two cameras and one or more light sources of the illumination system are arranged with respect to one another in such a way that directional reflections of the light source or light sources for each camera appear at different locations of a check field of the surface inspection system,
- wherein for each camera of the camera system, alongside a first region of the check field in which the directional reflections of the light source or light sources appear, a second region of the check field without the directional reflections of the light source or light sources remains,
- wherein the second region for each color channel, and for all of the at least two cameras taken together, constitutes at least 40% of the area of the check field, or at least 60% of the area of the check field, and/or
- wherein the second regions over all the color channels and cameras cover the entire check field.

3. The surface inspection system as claimed in claim 1, wherein the evaluation system evaluates a plurality of recordings of the surface to be checked, which differ with regard to the position of the camera used to record them with respect to the surface to be checked,
- wherein the evaluation system assesses a local deviation in the brightness and/or color which is contained in a plurality of recordings as a surface defect if the local deviation in at least one recording appears brighter in at least one first subregion and darker in at least one second subregion than a surface region surrounding the local deviation and/or has different subregions in which different colors stand out more intensely than the other color.

4. The surface inspection system as claimed in claim 1, wherein the illumination system includes at least two spatially separate regions, and
- wherein the at least two spatially separate regions have different colors and/or are arranged on opposite sides of the surface inspection system.

5. The surface inspection system as claimed in claim 4, wherein the illumination system or the at least two spatially separate regions is/are realized in rod-shaped or ring-shaped fashion and/or contain(s) one or more light sources which emit nondirectionally.

6. The surface inspection system as claimed in claim 1, wherein the illumination system has at least two spatially separate and different-colored regions and the camera system includes at least one color camera having at least two color channels,
- wherein the brightness distribution generated by the spatially separate, different-colored regions of the illumination device is recorded simultaneously and independently of one another over the different color channels of the camera and/or is evaluated by the evaluation system, and/or
- wherein the evaluation system assesses a local deviation in the brightness as a surface defect if the local deviation appears brighter or darker in at least one first subregion in a first color channel and in at least one second subregion in a second color channel than a surface region surrounding the local deviation.

7. The surface inspection system as claimed in claim 1, wherein the camera system comprises a plurality of cameras and a simultaneous image recording of all the cameras of the camera system is sufficient for fully inspecting a check field, and/or
- wherein the surface inspection system has an extent that is not larger than 1.5 times the extent of a check field, and wherein the extent of the surface inspection system is an extent in a plane parallel to the check field.

8. The surface inspection system as claimed in claim 1, wherein a plurality of regions of the illumination system are arranged rotated by an angle with respect to one another relative to the check field,
- wherein two regions of the illumination system are arranged in a manner rotated by 90° with respect to one another relative to the check field, and
- wherein the two regions of the illumination system extend in rod-shaped fashion along an edge of the surface inspection system.

9. The surface inspection system as claimed in claim 1, wherein the cameras of the camera system are situated within an area enclosed by regions of the illumination system, and
- wherein the regions of the illumination system extend in rod-shaped fashion along an edge of the surface inspection system.

10. The surface inspection system as claimed in claim 1, further comprising:
- a kinematic unit configured to move the surface inspection system relative to the surface to be checked; and
- a controller,
- wherein the kinematic unit is controlled along a defined path by the controller.

11. The surface inspection system as claimed in claim 1, wherein the checking is effected during a relative movement of the surface inspection system with respect to the surface to be checked.

12. The surface inspection system as claimed in claim 1, wherein the surface inspection system forms a structural unit with a 3D measurement system with a stripe projection system, and
  wherein a camera of the 3D measurement system is surrounded by cameras of the camera system and/or regions of the illumination system of the surface inspection system.

13. A method for detecting surface defects of a surface to be checked with a surface inspection system including a camera system and an illumination system, the method comprising:
  generating, by the illumination system, together with reflection and scattering properties of the surface to be checked, at least one of a brightness distribution and a color distribution in which surface defects become visible as local deviations in at least one of a brightness and a color, said distribution being detected by the camera system; and
  determining a local deviation in the color to be a surface defect when a first color channel of a plurality of color channels of the camera system is brighter than a remainder of the plurality of color channels in at least one first subregion and a second color channel of the plurality of color channels of the camera system is brighter than a remainder of the color channels in at least one second subregion.

14. The method of claim 13, wherein the surface to be checked is completely or partly imaged by at least two cameras, and
  wherein the method further comprises:
  arranging the cameras and a light source or light sources of the illumination system with respect to one another and with respect to the surface to be checked such that directional reflections of the light source or light sources for each camera appear at different locations of the surface to be checked.

* * * * *